(12) United States Patent
Maier et al.

(10) Patent No.: US 7,588,845 B2
(45) Date of Patent: Sep. 15, 2009

(54) ADVANCED CONTROL FOR AN ELECTRICAL HEATABLE WAX THERMOSTAT IN THE THERMAL COOLANT LOOP OF FUEL CELL SYSTEMS

(75) Inventors: Oliver Maier, Worms (DE); Peter Willimowski, Darmstadt (DE)

(73) Assignee: GM Global Technology Operations, Inc., Detroit, MI (US)

( * ) Notice: Subject to any disclaimer, the term of this patent is extended or adjusted under 35 U.S.C. 154(b) by 671 days.

(21) Appl. No.: 11/304,184

(22) Filed: Dec. 15, 2005

(65) Prior Publication Data

US 2007/0065694 A1 Mar. 22, 2007

Related U.S. Application Data

(60) Provisional application No. 60/719,527, filed on Sep. 22, 2005.

(51) Int. Cl.
*H01M 8/04* (2006.01)
(52) U.S. Cl. .............................. 429/13; 429/23; 429/24; 429/26
(58) Field of Classification Search ............. 429/101 A, 429/24; 219/494
See application file for complete search history.

(56) References Cited

U.S. PATENT DOCUMENTS

| | | | |
|---|---|---|---|
| 5,841,204 A * | 11/1998 | English | 307/117 |
| 6,651,761 B1 | 11/2003 | Hrovat et al. | |
| 6,749,016 B2 * | 6/2004 | Ozawa | 165/264 |
| 2005/0178523 A1 | 8/2005 | Itoh et al. | |
| 2007/0154756 A1 * | 7/2007 | Fujita et al. | 429/23 |
| 2008/0265044 A1 * | 10/2008 | Maier | 236/101 A |

* cited by examiner

*Primary Examiner*—Patrick Ryan
*Assistant Examiner*—Ashley Kwon

(57) ABSTRACT

A control algorithm for a by-pass valve in a thermal sub-system of a fuel cell system, where the by-pass valve includes a wax element that is heated by a heating element. A stack power loss is applied to a PDT1 controller that associates a PDT dynamic function to the loss. The difference between the desired temperature of the stack and the actual temperature of the stack is applied to a PI controller that provides an error value of the difference. The actual temperature of the stack is applied to a look-up table that provides a value based on how close the actual temperature is to the opening temperature of the wax element. The values from the PDT1 controller, the PI controller and the look-up table are added to provide an output signal to control the current applied to the heater element, and thus, the heat applied to the wax element.

19 Claims, 2 Drawing Sheets

ADVANCED CONTROL FOR AN ELECTRICAL HEATABLE WAX THERMOSTAT IN THE THERMAL COOLANT LOOP OF FUEL CELL SYSTEMS

CROSS REFERENCE TO RELATED APPLICATIONS

This application claims the benefit of the priority date of U.S. Provisional Patent Application No. 60/719,527, titled Advanced Control for an Electrical Heatable Wax Thermostat in the Thermal Coolant Loop of Fuel Cell Systems, filed Sep. 22, 2005.

BACKGROUND OF THE INVENTION

1. Field of the Invention

This invention relates generally to a control algorithm for a by-pass valve for a thermal sub-system of a fuel cell system and, more particularly, to a control algorithm for a by-pass valve that includes a wax expansion element for a thermal sub-system of a fuel cell system, where the control algorithm provides control and preheating of the wax expansion element using a PDT1 controller, a PI controller and a look-up table.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work can act to operate a vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more individual cells. The fuel cell stack receives a cathode reactant gas, typically a flow of air forced through the stack by a compressor. Not all of the oxygen is consumed by the stack and some of the air is output as a cathode exhaust gas that may include liquid water and/or water vapor as a stack by-product. The fuel cell stack also receives an anode hydrogen reactant gas that flows into the anode side of the stack.

It is necessary that a fuel cell stack operate at an optimum relative humidity and temperature to provide efficient stack operation and durability. A typical stack operating temperature for automotive applications is about 80° C. The stack temperature provides the relative humidity within the fuel cells in the stack for a particular stack pressure. Excessive stack temperatures above the optimum temperature may damage fuel cell components and reduce the lifetime of the fuel cells. Also, stack temperatures below the optimum temperature reduces the stack performance. Therefore, fuel cell systems employ thermal sub-systems that control the temperature within the fuel cell stack to maintain a thermal equilibrium.

A typical thermal sub-system for an automotive fuel cell stack includes a radiator, a fan and a pump. The pump pumps a cooling fluid, such as water and glycol mixture, through cooling fluid channels within the fuel cell stack where the cooling fluid collects the stack waste heat. The cooling fluid is directed through a pipe or hose from the stack to the radiator where it is cooled by ambient air either forced through the radiator from movement of the vehicle or by operation of the fan. Because of the high demand of radiator airflow to reject a large amount of waste heat to provide a relatively low operating temperature, the fan is usually powerful and the radiator is relatively large. The physical size of the radiator and the power of the fan have to be higher compared to those of an internal combustion engine of similar power rating because of the lower operating temperature of the fuel cell system and the fact that only a comparably small amount of heat is rejected through the cathode exhaust in the fuel cell system.

The fuel cell stack requires a certain cooling fluid flow rate to maintain the desired stack operating temperature. The cooling fluid flow rate has to be large enough so that the fuel cell stack does not get hot spots that could damage the cells. Various system parameters determine the cooling fluid flow rate including, but not limited to, the current density of the stack, the cooling fluid temperature, the cooling fluid viscosity, system pressure drop, valve position, etc. For a thermal sub-system employing a centrifugal flow pump, the cooling fluid flow correlates to the system pressure drop because there is no independence of pressure as in displacement pumps.

Because fuel cell systems are thermally sensitive, the cooling fluid flow typically requires a flow controller, such as a proportional-integral (PI) feedback controller, well known to those skilled in the art. Feedback controllers typically require a proportionally controllable pump. Because the pressure is unknown, the actual cooling fluid flow is necessary for the flow controller.

FIG. 1 is a schematic diagram of a thermal sub-system for a fuel cell system 10 including a fuel cell stack 12. A coolant loop pump 14 pumps a suitable cooling fluid, such as a water/glycol mixture, through a coolant loop 16 and cooling fluid flow channels in the stack 12. A first temperature sensor 18 measures the temperature of the cooling fluid in the coolant loop 16 as it is being input into the stack 12 and a temperature sensor 20 measures the temperature of the cooling fluid in the coolant loop 16 as it is being output from the stack 12. A suitable chilling device, such as a radiator 24, cools the cooling fluid in the coolant loop from the stack 12 so that it is reduced in temperature. The radiator 24 may include a fan (not shown) that forces cooling air through the radiator 12 to increase the cooling efficiency of the radiator 24. Further, other cooling devices can also be used instead of the radiator 24. A by-pass line 28 in the coolant loop 16 allows the radiator 24 to be by-passed if the operating temperature of the stack 12 is lower than the desired operating temperature, such as at system start-up. A by-pass valve 30 is selectively controlled to distribute the cooling fluid either through the radiator 24 or through by-pass line 28 to help maintain a desired operating temperature.

Various types of valves are known in the art that can be used for the by-pass valve 30. One known by-pass valve for this purpose is a motorized valve that uses a motor to control the position of the valve to provide the desired temperature of the stack 12. Such motorized valves are fairly good at providing the desired stack temperature because they provide a good proportional movement of the valve mechanism, and provide reliable feedback for a PI controller to establish the position of the valve. However, the valve itself is typically not reliable because it is susceptible to leaks and other mechanical problems. Further, these types of motorized valves are costly, large and heavy.

It is also known in the art to use a two-way valve including a performance-map thermostat having a wax expansion element for the by-pass valve 30. In one particular valve design, a heater element is provided in the wax expansion element that causes it to expand when heated to open the valve and direct the cooling fluid through the radiator 24 in a proportional manner. The density and volume of the wax expansion element changes depending on the temperature of the element. The wax expansion element is designed so that it melts at a certain temperature when heated. The melting temperature of the wax element needs to be in the range of the operating temperature of the cooling fluid, so that the cooling fluid does not cause the wax expansion element to melt. One example of a suitable valve for this purpose is the map-controlled thermostat valve available from Behr Thermot-Tronik GmbH of Kornwestheim, Germany.

FIG. 2 is a simplified diagram of a thermostat by-pass valve 32. The valve 32 includes a wax expansion element 34 having a heater wire 36 therein. When the heater wire 36 is off and the cooling temperature is lower than the melting temperature, the wax expansion element 34 is in its contracted position so that it blocks the flow of the cooling fluid from the radiator 24 to the stack 12 using the seal 66, and allows the cooling fluid flow through the by-pass line 28. The cooling fluid from the by-pass line 28 flows into the valve 32 through opening 60, the cooling fluid from the radiator flows into the valve 32 through the opening 62 and the cooling fluid flows out of the valve 32 to the pump 14 through the opening 64. When the heater wire 36 is on and/or the cooling fluid temperature is higher than the wax melting temperature, so that the wax temperature is higher than the wax melting temperature, the expansion element 34 melts and expands so that the cooling fluid is directed through the radiator 24. The current applied to the heater wire 36 is selectively controlled so that the wax expansion element 34 contracts and expands in a proportional manner to control the amount of cooling fluid that is sent through the radiator 24 as a function of the seals 66 and 68.

A control algorithm is employed to control the heating of the wax expansion element 34 to provide the desired temperature of the stack 12, as discussed above. However, known control algorithms, such as those used for motorized valves, are typically not suitable because of the dynamic nature of the wax element 34, the difficulty to estimate its nonlinear behavior, and no position feedback of the element 34. Particularly, it is difficult to control the deviation of the wax element 34 for long periods of time.

If the temperature of the system is higher than the set-point, a normal controller commands 100% heater power for the heater wire 36. The wax expansion element 34 expands as a result of the heater power and the cooling temperature. If the cooling system performance is too low and the heater controller commands 100%, the maximum displacement of the wax expansion element 34 is reached, so that the wax expansion element 34 gets over-heated. If the temperature set-point decreases, it takes a long time to close the path to the radiator 24 because the wax element 34 is overheated. The result is a large time delay, which causes dynamic problems and stable operation of the stack 12.

SUMMARY OF THE INVENTION

In accordance with the teachings of the present invention, a control algorithm for a by-pass valve in a thermal sub-system of a fuel cell system is disclosed, where the by-pass valve includes a wax expansion element that is heated by a heating element. The control algorithm adds an output from a PDT1 controller, an output from a PI controller and an output from a look-up table. A stack power loss value is applied to the PDT1 controller that associates a PDT dynamic function to the power loss. The difference between the desired temperature of the stack and the actual temperature of the stack is applied to the PI controller that generates an error value of the difference. The PI controller is used for minimizing the permanent control deviation. The actual temperature of the stack is applied to the look-up table that provides a value based on how close the temperature of the stack 12 is to the temperature where the wax element is heated to cause it to expand. The values from the PDT1 controller, the PI controller and the look-up table are added to provide an output signal to control the current applied to the heater element, and thus, the heat applied to the wax element.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a control algorithm for controlling the position of a by-pass valve in a thermal sub-system of a fuel cell system is merely exemplary in nature, and is in no way intended to limit the invention or its application or uses.

Figure 1:
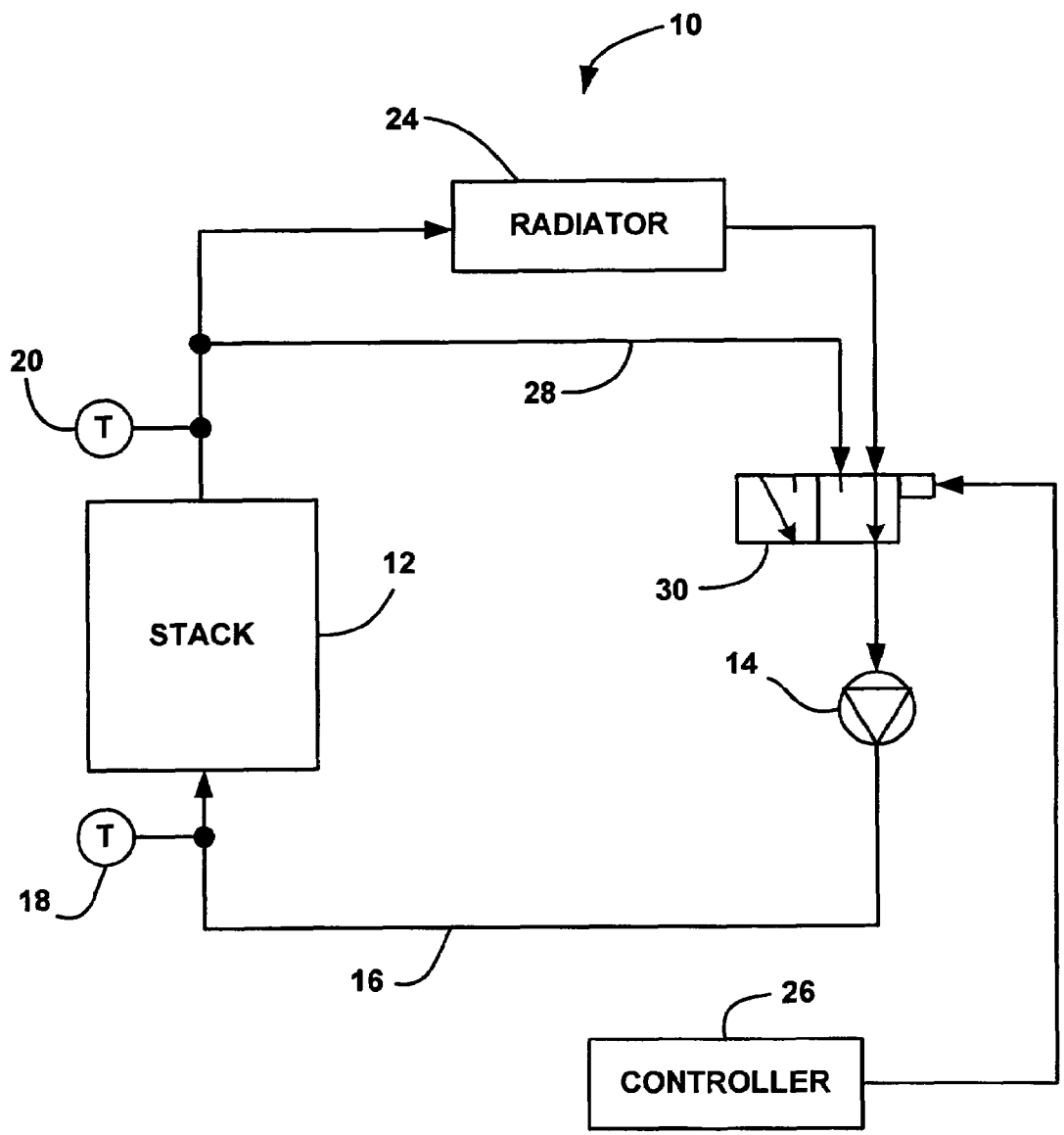
FIG. 1 is a schematic diagram of a thermal sub-system for a fuel cell system, where the thermal sub-system includes a by-pass valve including a wax expansion element that is controlled by a control algorithm, according to an embodiment of the present invention.
Figure 2:
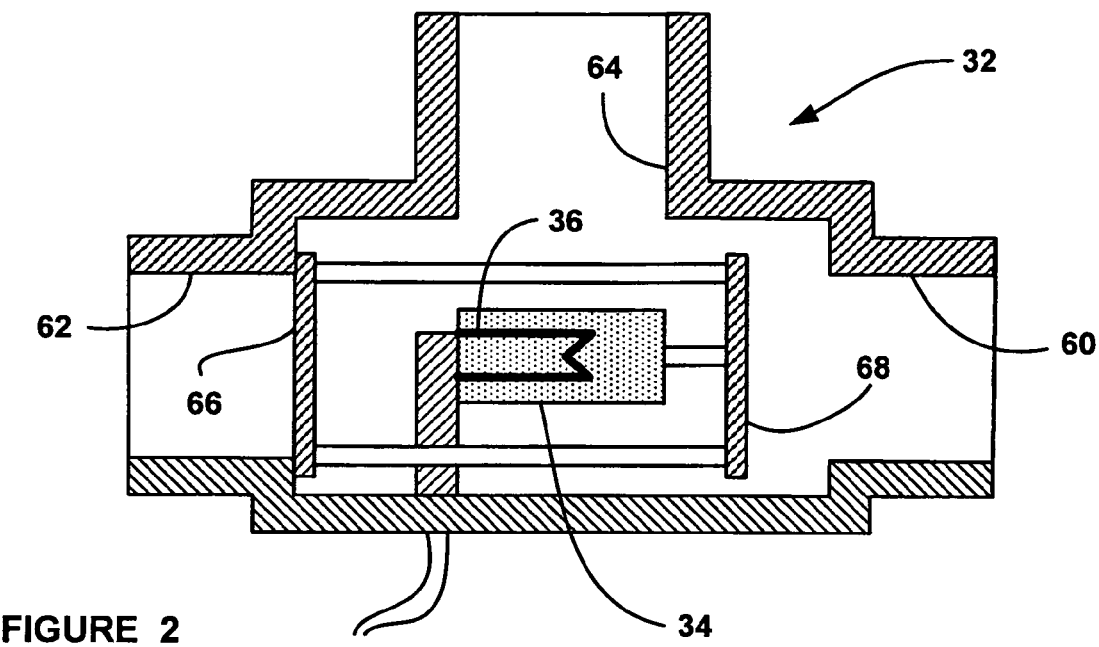
FIG. 2 is a simplified view of the by-pass valve in the thermal sub-system shown in FIG. 1.
Figure 3:
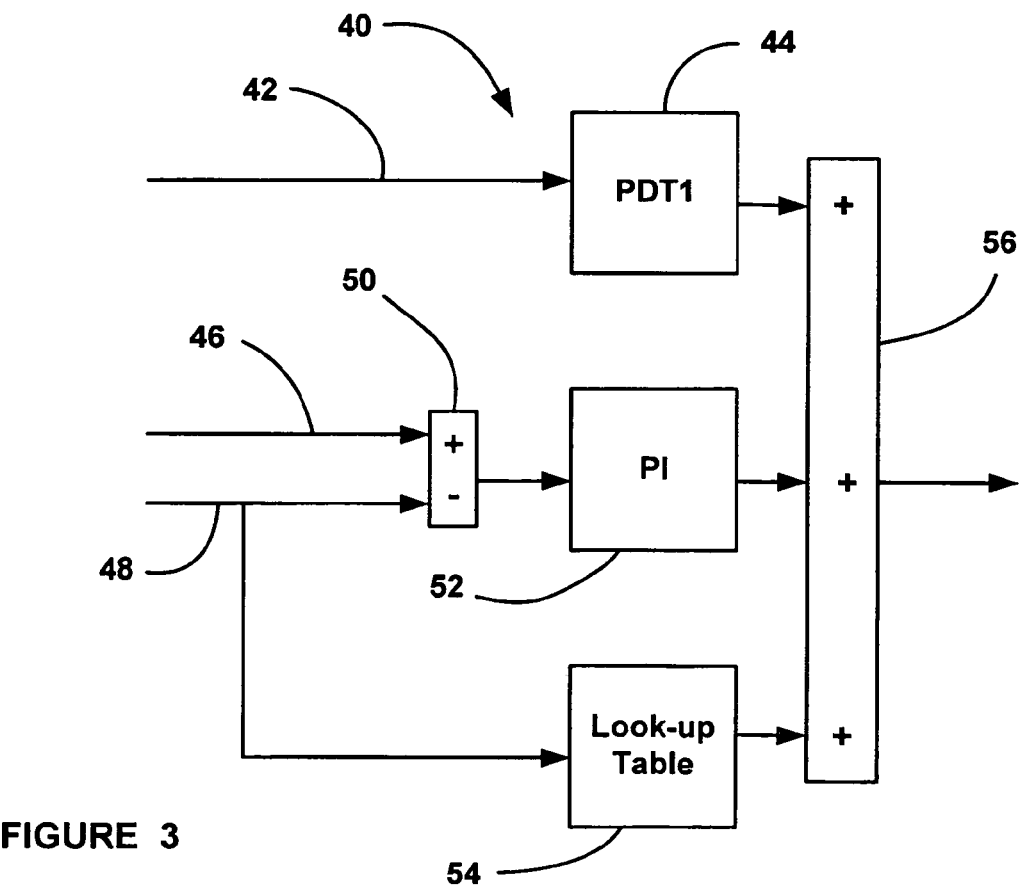
FIG. 3 is a block diagram of the control algorithm to control the by-pass valve.

FIG. 3 is a block diagram of a control system 40 employing a control algorithm for controlling the by-pass valve 32, according to an embodiment of the present invention. The control system 40 includes a proportional-derivative controller, such as a PDT1 controller 44, that receives a signal of the thermal stack power loss on line 42. The stack power loss is a representative value of the thermal losses of the stack 12, and can be calculated by various techniques well known to those skilled in the art. One non-limiting technique for determining the stack power loss includes multiplying the stack current by the difference between the stack open circuit voltage and the stack voltage. The PDT1 controller 44 operates as a transient that provides a damped derivative of the stack power loss. For example, if a power step from engine idle to full stack load is required, the derivative of the stack power loss signal is positive. This means that the wax element 34 in the valve 32 is preheated, which reduces the time delay for opening the coolant loop path through the radiator 24. Additionally, the temperature overshoot is reduced. Suitable algorithms to provide a damp derivative in the PDT1 controller 44 are well known to those skilled in the art.

A desired temperature set-point value on line 46 and a measured temperature value on line 48 are applied to a comparator 50 that generates a difference signal between the two temperature values. The desired temperature set-point of the stack 12 is the desired operating temperature for a particular operation scheme of the system 10 at a particular location in the thermal sub-system. The measured temperature can be measured by the temperature sensor 18, the temperature sensor 20, or any other temperature sensor suitable for the purposes described herein. For example, if the algorithm is attempting to maintain the temperature of the stack 12 a certain temperature, then that value is the temperature set-point and the measured temperature is the temperature of the cooling fluid measured by the sensor 20 at the output of the stack 12.

The difference signal from the comparator 50 is applied to a proportional-integral (PI) controller 52 that operates as a standard temperature feedback controller. The PI controller 52 provides proportional and integral control to the difference signal to generate an output signal that will reduce the difference between the temperature set-point value and the measured temperature value. In one embodiment, the range of the control provided by the PI controller 52 is relatively small because it is only a portion of the total output that controls the position of the valve 32. For example, if the temperature set-point value is larger than the measured temperature value, then the comparator 50 outputs a positive value that generates a negative proportional-integral value at the output of the controller 52, so that the temperature of the cooling fluid will increase. PI controllers of this type are well known to those skilled in the art.

The actual temperature value on line 48 is also applied to a look-up table 54. As discussed above, it is desirable to maintain the temperature of the stack 12 at a desirable operating temperature. The output power of the stack 12, and other factors, determine how much of the cooling fluid needs to pass through the radiator 24 to provide that temperature. As the temperature of the cooling fluid increases, the valve 32 is opened more so that more of the cooling fluid flows through the radiator 24.

The wax element 34 in the valve 32 is designed to melt at a certain temperature to open the valve 32. This melting temperature must be in the range of the maximum operating temperature of the stack 12 because the temperature of the cooling fluid flowing through the valve 32 should cause the wax to melt and open the valve 32 at system failures. The look-up table 54 uses the actual temperature measurement to anticipate when the by-pass valve 32 will need to be opened, and how much it will need to be opened. The output of the look-up table 54 provides a value based on the measured temperature that applies the proper amount of current to the heater wire 36 to raise the temperature of the wax element 34 to just below its melting temperature so that it is closer to its melting temperature when the by-pass valve 32 needs to be opened. For example, if the by-pass valve 30 is designed to be opened when the measured temperature reaches 75° C., then as the measured temperature approaches that value, the look-up table 54 provides a current to signal to the heater wire 36 that preheats the wax element 34 to just below its melting temperature so that the time delay of opening the valve 30 is minimized.

The control values from the PDT1 controller 44, the PI controller 52 and the look-up table 54 are added by an adder 56. The added control value is then used by the controller 26 to determine the amount of resistive heating provided by the wire 36 to heat the wax element 34 to open and close the by-pass valve 32.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A system for controlling the temperature of a fuel cell stack, said system comprising:
    a coolant loop for circulating a cooling fluid through the stack;
    a radiator for cooling heated cooling fluid from the stack;
    a by-pass valve for selectively causing the cooling fluid to pass through or by-pass the radiator, said by-pass valve including a wax expansion element having a heater element that heats the wax element to cause it to expand;
    at least one temperature sensor for measuring the temperature of the cooling fluid and providing a measured temperature signal; and
    a controller for providing a heater signal to the heater element in the by-pass valve to control how much of the cooling fluid flows through the radiator and how much of the cooling fluid by-passes the radiator, said controller including a proportional derivative control unit responsive to a stack power loss signal, said proportional derivative control unit generating a proportional derivative signal based on the stack power loss signal, a comparator responsive to a predetermined temperature set-point signal and the measured temperature signal and providing a difference signal of the difference therebetween, a proportional integral control unit responsive to the difference signal and providing a proportional integral signal to minimize the difference signal, and a look-up table responsive to the measured temperature signal, said look-up table providing a preheat signal for preheating the heater element based on the measured temperature signal, wherein the controller adds the proportional derivative signal, the proportional integral signal and the preheat signal to provide the heater signal.

2. The system according to claim 1 wherein the at least one temperature sensor is a temperature sensor that measures the temperature of the cooling fluid just before it enters the fuel cell stack.

3. The system according to claim 1 wherein the at least one temperature sensor is a temperature sensor that measures the temperature of the cooling fluid just after it exits the fuel cell stack.

4. The system according to claim 1 wherein the at least one temperature sensor is a temperature sensor that measures the temperature of the cooling fluid just after it exits the fuel cell stack and a temperature sensor that measures the temperature of the cooling fluid just before it enters the fuel cell stack, where the measured temperature signal is an average of the two measured temperatures.

5. The system according to claim 1 wherein the controller determines the stack power loss signal by multiplying the stack current by the difference between the stack open circuit voltage and the stack voltage.

6. The system according to claim 1 wherein the proportional derivative control unit operates as a transient that provides a damped derivative of the stack power loss signal.

7. The system according to claim 1 wherein the proportional integral signal is a relatively small portion of the heater signal.

8. The system according to claim 1 wherein more cooling fluid passes through the radiator as the wax expansion element expands.

9. The system according to claim 1 wherein the fuel cell stack is on a vehicle.

10. A system for controlling the temperature of a fuel cell stack, said system comprising:
- a coolant loop for circulating a cooling fluid through the stack;
- a radiator for cooling heated cooling fluid from the stack;
- a by-pass valve for selectively causing the cooling fluid to pass through or by-pass the radiator, said by-pass valve including a wax expansion element having a heater element that heats the wax element to cause it to expand;
- at least one temperature sensor for measuring the temperature of the cooling fluid and providing a measured temperature signal; and
- a controller for providing a heater signal to the heater element in the by-pass valve to control how much of the cooling fluid flows through the radiator and how much of the cooling fluid by-passes the radiator, said heater signal being a combination of a plurality of other signals that combine to preheat the wax expansion element to minimize the delay in causing the wax expansion element to expand.

11. The system according to claim 10 wherein the controller includes a proportional derivative control unit generating a proportional derivative signal based on stack power loss, said proportional derivative signal being one of the plurality of other signals.

12. The system according to claim 11 wherein the proportional derivative control unit operates as a transient that provides a damped derivative of the stack power loss.

13. The system according to claim 10 wherein the controller includes a proportional integral control unit that provides a proportional integral signal representative of the difference between the measured temperature signal and a predetermined temperature set-point signal, said proportional integral signal being one of the plurality of other signals.

14. The system according to claim 13 wherein the PI signal is a relatively small portion of the heater signal.

15. The system according to claim 10 wherein the controller includes a look-up table, said look-up table providing a preheat signal based on the measured temperature signal, said preheat signal being one of the plurality of other signals.

16. A method for controlling the temperature of a fuel cell stack, said method comprising:
- circulating a cooling fluid through the stack;
- causing a wax expansion element in a by-pass valve to expand or contract to selectively control whether the cooling fluid by-passes a radiator outside of the stack;
- measuring the temperature of the cooling fluid;
- providing a first control signal based on stack power loss;
- providing a second control signal that minimizes the difference between the measured temperature signal and a predetermined temperature set-point signal;
- providing a third control signal based on the measured temperature signal; and
- combining the first, second and third control signals to provide a combined signal that controls the expansion of the wax expansion element.

17. The method according to claim 16 wherein providing a first control signal includes using a proportional derivative controller to provide a damp derivative of the stack power loss.

18. The method according to claim 16 wherein providing a second control signal includes using a proportional integral controller unit to minimize the difference between the measured temperature signal and the temperature set-point signal.

19. The method according to claim 16 wherein providing the third control signal includes using a look-up table to provide a preheat signal for preheating the wax expansion element based on the measured temperature signal.

* * * * *